United States Patent Office 3,773,780
Patented Nov. 20, 1973

3,773,780
1-(1,3,4-THIADIAZOL-2-YL)-IMIDAZOLIDINONE-(2) COMPOUNDS
Carl Metzger, Wuppertal-Elberfeld, Dietrich Rucker, Bietigheim, and Ludwig Eue, Cologne, Germany, assignors to Bayer Aktiengesellschaft, Leverkusen, Germany
No Drawing. Filed Mar. 10, 1971, Ser. No. 123,012
Int. Cl. C07d 99/10
U.S. Cl. 260—306.8 D                                    18 Claims

ABSTRACT OF THE DISCLOSURE

Certain 1-(1,3,4-thiadiazol-2-yl)-imidazolidinone - (2) compounds of the formula:

![structure]

in which

R is hydrogen, alkyl, haloalkyl, cycloalkyl, alkoxy, alkoxyalkyl, halocycloalkyl, aryl, alkenyl, alkyny or a radical in which these substituents are linked to the nitrogen atom through a thia-linkage which may be oxidized to sulfonyl or sulfoxy; and
$R_1$ is lower alkyl, alkenyl or alkynyl;

are outstandingly potent herbicides and exhibit particularly selective action.

---

The present invention relates to certain novel 1-(1,3,4-thiadiazol-2-yl)-imidazolidinone-(2) compounds, to herbicidal compositions containing them and to their use as herbicides.

It is known that thiazolylureas, for example 1-(4-methyl-1,3-thiazolyl-2-yl)-3-methylurea, can be used as herbicides from Belgian patent specification 679,138. The herbicidal potency of these previously known ureas, however, is relatively low and therefore not always satisfactory under conditions obtaining in practice.

It was very surprising, therefore, that the active compounds according to the invention exhibit a higher herbicidal activity with, at the same time, selectivity in respect of agricultural cultivated plants, then the previously known thiazolylureas. The active compounds according to the invention therefore represent a substantial enrichment of the art.

The compounds of the present invention are 1-(1,3,4-thiadiazol - 2 - yl)-imidazolidinone-(2) derivatives of the general formula:

![structure] (I)

in which

R is hydrogen, alkyl, haloalkyl, cycloalkyl, alkoxy, alkoxyalkyl, halocycloalkyl, alkoxyalkylthio, optionally substituted aryl, alkenyl, alkynyl, alkylthio, optionally substituted aralkylthio, alkenylthio, alkynylthio, alkyl- sulfoxyl, alkylsulfonyl, alkenylsulfoxyl, alkenylsufonyl, alkynylsulfoxyl, alkynylsulfony, aralkylsulfoxyl or aralkylsulfonyl; and
$R_1$ is lower alkyl, alkenyl or alkynyl.

Thus R can be alkyl, haloalkyl, cycloalkyl or halocycloalkyl of from 1 to 8 carbon atoms; R can be alkenyl or alkynyl of up to 6 carbon atoms; R can be alkenylthio or alkynylthio of up to 6 carbon atoms and R can be alkylsulfonyl, alkenylsulfonyl or alkynylsulfonyl of up to 6 carbon atoms.

Preferably R is hydrogen, alkyl of from 1 to 4 carbon atoms, haloalkyl of from 1 to 4 carbon atoms, cycloalkyl of from 5 to 8 carbon atoms, alkoxy of from 1 to 4 carbon atoms, alkoxyalkyl of from 1 to 4 carbon atoms in each of the alkyl and alkoxy moieties, halocycloalkyl of from 5 to 8 ring carbon atoms, alkoxyalkylthio of from 1 to 4 carbon atoms in each of the alkyl and alkoxy moieties, optionally substituted aryl of from 6 to 10 carbon atoms, alkenyl of from 3 to 6 carbon atoms, alkynyl of from 2 to 5 carbon atoms, alkylthio of from 1 to 4 carbon atoms, optionally substituted aralkylthio of from 6 to 10 carbon atoms in the aryl moiety and 1 to 4 carbon atoms in the alkyl moiety, alkenylthio of from 2 to 4 carbon atoms, alkynylthio of from 3 to 6 carbon atoms, alkylsulfoxyl of from 1 to 4 carbon atoms, alkylsulfonyl of from 1 to 4 carbon atoms, alkenylsulfoxyl of from 2 to 4 carbon atoms, alkenylsulfonyl of from 2 to 4 carbon atoms, alkynylsulfonyl of from 3 to 6 carbon atoms, aralkylsulfoxyl and aralkylsulfonyl of from in each case, 6 to 10 carbon atoms in the aryl moiety and 1 to 4 carbon atoms in the alkylene moiety.

$R_1$ is preferably alkyl of from 1 to 5 carbon atoms, or alkenyl or alkynyl of from, in each case, 2 to 5 carbon atoms.

It has been found that these compounds exhibit strong herbicidal properties.

The invention also provides a process for the production of a 1-(1,3,4-thiadiazol-2-yl)-imidazolidinone-(2) derivative of the Formula I in which a 1,3,4-thiadiazolyl-2-yl urea of the general formula:

![structure] (II)

in which

R and $R_1$ have the meanings stated above is reacted with glyoxal in the presence of an alkaline catalyst.

The reaction is optionally carried out in the presence of a diluent.

If 1-(5-trifluoromethyl-1,3,4-thiadiazol-2-yl)-3-methylurea and glyoxal are used as starting materials, the reaction course can be represented by the following reaction scheme:

![scheme]
(III)

The 1,3,4-thiadiazol-2-ylureas to be used as starting materials are defined generally by the Formula II.

Examples of the urea derivatives of Formula II include:

1-(5-trifluoromethyl-1,3,4-thiadiazol-2-yl)-3-methylurea,
1-(5-trifluoromethyl-1,3,4-thiadiazol-2-yl)-3-n-butylurea,
1-(5-trifluoromethyl-1,3,4-thiadiazol-2-yl)-3-propargylurea,
1-(5-methyl-1,3,4-thiadiazol-2-yl)-3-methylurea,
1-(5-n-butyl-1,3,4-thiadiazol-2-yl)-3-ethylurea,
1-(5-tert.-butyl-1,3,4-thiadiazol-2-yl)-3-n-butylurea,
1-(5-cyclohexyl-1,3,4-thiadiazol-2-yl)-3-methylurea,
1-(5-phenyl-1,3,4-thiadiazol-2-yl)-3-ethylurea,
1-(5-$\alpha$-naphthyl-1,3,4-thiadiazol-2-yl)-3-isopropylurea,
1-(5-methylthio-1,3,4-thiadiazol-2-yl)-3-methylurea,
1-(5-methoxy-1,3,4-thiadiazol-2-yl)-3-ethylurea,
1-(5-benzyl-1,3,4-thiadiazol-2-yl)-3-sec.-butylurea,
1-(allyl-1,3,4-thiadiazol-2-yl)-3-methylurea,
1-(5-benzylthio-1,3,4-thiadiazol-2-yl)-3-ethylurea,
1-(5-methylsulfonyl-1,3,4-thiadiazol-2-yl)-3-methylurea,
1-(5-n-propylsulfonyl-1,3,4-thiadiazol-2-yl)-3-methylurea,
1-(5-ethylsulfonyl-1,3,4-thiadiazol-2-yl)-3-methylurea,
1-(5-methylsulfoxyl-1,3,4-thiadiazol-2-yl)-3-methylurea,
1-(5-methylsulfoxyl-1,3,4-thiadiazol-2-yl)-3-n-butylurea,
1-(1,3,4-thiadiazol-2-yl)-urea,
1-(1,3,4-thiadiazol-2-yl)-3-methylurea,
1-(5-ethynyl-1,3,4-thiadiazol-2-yl)-3-ethylurea,
1-(5-benzylsulfoxyl-1,3,4-thiadiazol-2-yl)-3-methylurea.

As diluents, there are suitable, besides water, all inert organic solvents, preferably those which are miscible with water. These include alcohols, such as methanol, ethanol; pyridines, such as pyridine, picolines or lutidines: and dimethyl formamide.

As alkaline catalysts, all customary bases can be used. Preferred bases include the alkali metal hydroxides, alkaline earth metal hydroxides, alkali metal carbonates, alkali metal alcoholates and tertiary amines. Particularly suitable are sodium hydroxide, sodium carbonate, sodium methylate, sodium ethylate and pyridine.

The reaction temperatures can be varied within a fairly wide range. In general, the reaction, is carried out at 0° C. to 80° C., preferably 20° C. to 40° C.

In a suitable way of carrying out the process according to the invention, each mole of urea derivative of Formula II is reacted with at least 1 mole of glyoxal. Preferably, 1.5–2.5 moles of glyoxal are used per mole of urea derivative. The reaction is expediently carried out by adding a 30%-strength aqueous solution of glyoxal (previously adjusted to a pH between 7 and 8 with sodium hydroxide solution) to the urea derivative dissolved in a suitable diluent, and reaction is allowed to take place for 1 to 3 days, optionally with cooling. Working up may take place by concentration of the reaction mixture and recrystallization of the residue.

The active compounds according to the invention have excellent herbicidal properties and can therefore be used for the control of weeds. By weeds in the widest sense are meant all plants which grow in places where they are not desired. Whether the substances according to the invention act as total of as selective herbicides depends essentially on the amount applied.

The substances according to the invention can be used for example in the case of the following plants: dicotyledons, such as mustard (Sinapis), cress (Lepidium), cleaver (Galium) common chickweed (Stellaria), mayweed (Matricaria), smallflower Galinsoga (Galinsoga), fat hen (Chenopodium), stinging nettles (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum, wheat (Triticum), millet (Panicum), sugar cane (Saccharum).

The compounds are especially suitable for selective weed control in cereals, cotton, sugar-beet and other cultivations. They can advantageously also be used for the control of spring wild oats.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulfoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing agents include lignin, sulfite waste liquors and methyl cellulose.

The active compounds according to the invention may be present in the formulations in admixture with the other active compounds or may be mixed therewith at the time of application.

The formulations contain, in general, 0.1 to 95, preferably 0.5 to 90, percent by weight of active compound.

The active compounds can be applied as such or in the form of their formulations or of the application forms prepared therefrom, such as ready-to-use solutions, emulsions, suspensions, powders, pastes and granulates. Application may take place in the usual manner, for example by spraying, squirting, dusting or scattering.

When the compounds are applied as total herbicides, the amounts of active compound are generally 15 to 30 kg./hectare. In selective weed control, the applied amounts are generally 0.1 to 15 kg. per hectare, preferably 1 to 10 kg./hectare.

The active compounds can be used before or after the emergence of the cultivated plants and the weeds, especially after the emergence.

The active compounds according to the invention also exhibit fungicidal and insecticidal properties and also act against mosquito larvae.

The invention therefore provides a herbicidal composition containing as active ingredient a compound according to the invention in admixture with a solid diluent or carrier or in admixture with a liquid diluent or carrier containing a surface-active agent.

The invention also provides a method of combating weeds which comprises applying to the weeds or a weed habitat a compound according to the invention alone or in the form of a composition containing as active ingredient a compound according to the invention in admixture with a solid or liquid diluent or carrier.

The invention is illustrated by the following examples.

EXAMPLE A

Post-emergence test

Solvent: 5 parts by weight acetone
Emulsifier: 1 part by weight alkylarylpolyglycol ether To produce a suitable preparation of active compound, 1 part by weight of active compound was mixed with the stated amount of solvent, the stated amounted of emulsifier was added and the concentrate was then diluted with water to the desired concentration.

Test plants which had a height of about 5–15 cm. were sprayed with the preparation of the active compound so that the amounts of active compound per unit area which are stated in the table were applied. Depending on the concentration of the spray liquor, the amount of water applied lies between 1000 and 2000 liters/hectare. After 3 weeks, the degree of damage to the plants was determined and characterized by the values 0–5, which have the following meaning:

0—No effect
1—A few slightly burnt spots
2—Marked damage to leaves
3—Some leaves and parts of stalks partially dead
4—Plant partially destroyed
5—Plant completely dead.

The test compounds, the amount applied and the results of the experiments are set forth in Tables 1 and 2.

TABLE 1.—POST-EMERGENCE TEST

| Active compound | Active compound applied, kg./ha. | Echinochloa | Chenopodium | Sinapis | Galinsoga | Stellaria | Carrots | Cotton | Wheat |
|---|---|---|---|---|---|---|---|---|---|
| 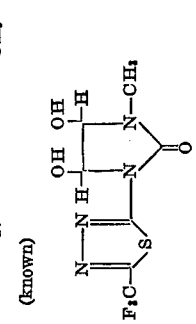 (known) | 4<br>2<br>1 | 3<br>3<br>1 | 5<br>4–5<br>4 | 5<br>4–5<br>4 | 5<br>4–5<br>3 | 4<br>3<br>2 | 1<br>1<br>0 | 2<br>1<br>0 | 2<br>1–2<br>0 |
| 4,5-dihydroxyl-1-(5-trifluoromethyl-1,3,4-thiadiazol-2-yl)-3-methylimidazolidinone-(2). | 2<br>1<br>0.5 | 5<br>5<br>5 | 5<br>4–5 | 5<br>5<br>5 | 5<br>5<br>5 | 5<br>5<br>5 | 5<br>5<br>5 | 2<br>1<br>0 | 2<br>1<br>0 |

TABLE 2.—POST-EMERGENCE TEST

| Active compound | Active compound applied, kg./ha. | Echinochloa | Chenopodium | Sinapis | Galinsoga | Stellaria | Urtica | Matricaria | Carrots | Oats | Cotton | Wheat | Beans |
|---|---|---|---|---|---|---|---|---|---|---|---|---|---|
| 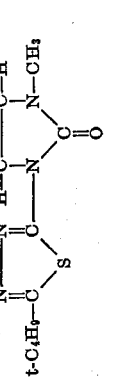 4,5-dihydroxyl-1-(5-tert.butyl-1,3,4-thiadiazol-2-yl)-3-methyl-imidazolidinone-(2). | 4<br>2<br>1<br>0.5<br>0.25 | 5<br>4<br>4<br>2–3 | 5<br>5<br>1<br>0 | 5<br>5<br>5<br>5 | 5<br>5<br>3–4<br>1 | 5<br>5<br>5<br>3<br>1 | 5<br>5<br>5<br>5<br>2 | 5<br>5<br>3<br>2<br>0 | 5<br>5<br>5<br>5<br>1 | 5<br>4–5<br>4–5<br>4<br>4 | 5<br>4–5<br>4–5<br>2<br>1 | 4–5<br>4–5<br>3<br>2<br>1 | 5<br>5<br>5<br>3<br>2 |

EXAMPLE B

Pre-emergence test

Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After three weeks, the degree of damage to the test plants was determined and characterized by the values 0–5, which have the following meaning:

0—No effect
1—Slight damage or delay in growth
2—Marked damage or inhibition of growth
3—Heavy damage and only deficient development or only 50% emerged
4—Plants partially destroyed after germination or only 25% emerged
5—Plants completely dead or not emerged.

The active compounds, the amounts applied and the results obtained can be seen from Table 3.

EXAMPLE 1

Preparation of 4,5-dihydroxy-1-(5-trifluoromethyl-1,3,4-thiadiazol-2-yl)-3-methylimidazolidinone-(2)

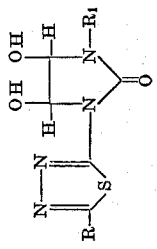

100 ml. of a 30%-strength aqueous solution of glyoxal, which solution had been previously adjusted to pH 7 to 8 with dilute sodium hydroxide solution, were added dropwise to a solution of 45.4 g. (0.2 mole) 1-(5-trifluoromethyl-1,3,4-thiadiazol-2-yl)-3-methylurea in 500 ml. ethanol. After standing overnight, the solvent was distilled off in a vacuum, and water was added to the residue. After recrystallization from acetonitrile, 4,5-dihydroxy-1 - (5 - trifluoromethyl-1,3,4-thiadiazol-2-yl)-3-methylimidazolidinone-(2) was obtained in crystalline form; melting point: 178° C.

EXAMPLES 2–4

In manner analogous to that of Example 1, the compounds set forth in Table 4 were prepared. The compounds are identified by the following definition of the meanings of R and $R_1$ in Formula 1, above:

| Example | R | $R_1$ | Melting point (°C.) |
|---|---|---|---|
| 2 | $CH_3SO_2$ | $CH_3$ | 55 |
| 3 | $CH_3S$ | $CH_3$ | 67 |
| 4 | tert.-$C_4H_9$ | $CH_3$ | 115 |

It will be understood that the specification and examples are illustrative but not limitative of the present invention and that other embodiments with the spirit and scope of the invention will suggest themselves to those skilled in the art.

What is claimed is:

1. 1-(1,3,4-thiadiazol-2-yl)-imidazolidinone-(2) compound of the formula:

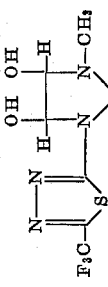

wherein
R is hydrogen, alkyl of from 1 to 8 carbon atoms; haloalkyl of from 1 to 8 carbon atoms; cycloalkyl or halocycloalkyl of from 5 to 8 ring carbon atoms; alkenyl or alkynyl of up to 6 carbon atoms; alkoxy of from 1 to 4 carbon atoms; alkoxyalkyl of from 1 to 4 carbon atoms in each of the alkyl and alkoxy moieties; alkoxyalkylthio of from 1 to 4 carbon atoms in each of the alkyl and alkoxy moieties; alkenylthio of from 2 to 4 carbon atoms; alkynylthio of from 3 to 6 carbon atoms; alkylsulfoxyl of from 1 to 4 carbon atoms; alkylsulfonyl of from 1 to 4 carbon atoms; alkenylsulfoxyl of from 2 to 4 carbon atoms; alkenylsulfonyl of from 2 to 4 carbon atoms; alkynylsulfoxyl of from 3 to 6 carbon atoms; alkynylsulfonyl of from 3 to 6 carbon atoms; aralkylthio; alkynylsulfonyl of from 6 to 10 carbon atoms in the aryl moiety and 1 to 4 carbon atoms in the alkyl moiety; aralkylsulfoxyl or aralkylsulfonyl where the

TABLE 3.—PRE-EMERGENCE TEST

| Active compound | Active compound applied, kg./ha. | Sinapis | Polygonum | Echinochloa | Chenopodium | Stellaria | Lolium | Matricaria | Oats | Cotton | Wheat | Maize |
|---|---|---|---|---|---|---|---|---|---|---|---|---|
| ![](OH OH / H-C-C-H / N-N / t-C₄H₉-S / N-CH₃ / O) | 20 | 5 | 5 | 5 | 5 | 5 | 5 | 5 | 5 | 4–5 | 4–5 | 4–5 |
| | 10 | 5 | 5 | 5 | 5 | 5 | 5 | 5 | 4–5 | 4–5 | 4–5 | 4–5 |
| | 5 | 5 | 5 | 5 | 5 | 5 | 5 | 5 | 4–5 | 4–5 | 4 | 4 |
| | 2.5 | 4 | 4–5 | 4–5 | 5 | 5 | 5 | 4 | 4 | 4 | 3 | 3 |
| | 1.25 | | | | | | | | | | | |

4,5-dihydroxyl-1-(5-tert.butyl-1,3,4-thiadiazol-2-yl)-3-methyl-imidazolidinone-(2).

aryl moiety is phenyl or naphthyl and the alkylene moiety contains from 1 to 4 carbon atoms; or R is phenyl or naphthyl; and $R_1$ is lower alkyl, alkenyl or alkynyl and $R_1$ contains not more than 5 carbon atoms.

2. Compound as claimed in claim 1 wherein R is hydrogen.

3. Compound as claimed in claim 1 wherein R is alkyl, haloalkyl or cycloalkyl or halocycloalkyl of from 1 to 8 carbon atoms.

4. Compound as claimed in claim 1 wherein R is alkoxy or alkoxyalkyl of from 1 to 4 carbon atoms in each alkyl moiety.

5. Compound as claimed in claim 1 wherein R is phenyl.

6. Compound as claimed in claim 1 wherein R is alkenyl or alkynyl of up to 6 carbon atoms.

7. Compound as claimed in claim 1 wherein R is alkylthio or alkoxyalkylthio of from 1 to 4 carbon atoms in each alkyl moiety.

8. Compound as claimed in claim 1 wherein R is aralkylthio of from 6 to 10 carbon atoms in the aryl moiety and of from 1 to 4 carbon atoms in the alkyl moiety.

9. Compound as claimed in claim 1 wherein R is alkenylthio or alkynylthio of up to 6 carbon atoms.

10. Compound as claimed in claim 1 wherein R is alkylsulfoxyl and alkenylsulfoxyl of up to 4 carbon atoms.

11. Compound as claimed in claim 1 wherein R is alkylsulfonyl, alkenylsulfonyl or alkynylsulfonyl of up to 6 carbon atoms.

12. Compound as claimed in claim 1 wherein R is aralkylsulfonyl.

13. Compound as claimed in claim 1 wherein $R_1$ is alkyl of from 1 to 5 carbon atoms.

14. Compound as claimed in claim 1 wherein $R_1$ is alkenyl or alkynyl of from 2 to 5 carbon atoms.

15. Compound as claimed in claim 1 designated 4,5-dihydroxyl-1-(5-trifluoromethyl - 1,3,4 - thiadiazol-2-yl)-3-methylimidazolidinone-(2).

16. Compound as claimed in claim 1 designated 4,5-dihydroxyl-1-(5-tert.butyl-1,3,4-thiadiazol-2-yl)-3-methyl-imidazolidinone-(2).

17. Compound as claimed in claim 1 designated 4,5-dihydroxyl-1-(5 - methylsulfoxyl - 1,3,4 - thiadiazol-2-yl)-3-methylimidazolidinone-(2).

18. Compound as claimed in claim 1 designated 4,5-dihydroxyl-1-(5-methylthio - 1,3,4 - thiadiazol - 2-yl)-3-methylimidazolidinone-(2).

References Cited

Mayer et al.: Chem. Abstracts, 73:77248b (1970).

RICHARD J. GALLAGHER, Primary Examiner

U.S. Cl. X.R.

71—90